United States Patent [19] [11] 4,325,134
Langley et al. [45] Apr. 13, 1982

[54] VIDEO DISC DEFECT DETECTOR

[75] Inventors: Howard M. Langley, Mooresville; Joseph W. Stephens, Plainfield, both of Ind.

[73] Assignee: RCA Corporation, New York, N.Y.

[21] Appl. No.: 197,287

[22] Filed: Oct. 15, 1980

[51] Int. Cl.³ .................. G11B 27/36; H04N 5/80
[52] U.S. Cl. .................................. 369/58; 369/126; 369/53
[58] Field of Search ............... 369/58, 53, 126, 130, 369/55, 56, 57, 170, 151, 264, 263, 262, 233; 360/38, 31; 358/128.5, 106; 324/61 R

[56] References Cited

U.S. PATENT DOCUMENTS

| | | | |
|---|---|---|---|
| 3,842,194 | 10/1974 | Clemens | 369/126 |
| 3,844,566 | 10/1974 | Groemel | 369/263 |
| 3,872,241 | 3/1975 | Adler | 369/43 |
| 3,963,860 | 6/1976 | Burrus | 369/126 |
| 3,997,876 | 12/1976 | Frush | 360/38 |
| 4,001,496 | 1/1977 | Clemens | 360/38 |
| 4,052,738 | 10/1977 | Hosomi | 369/126 |
| 4,124,217 | 11/1978 | Toyima | 369/151 |
| 4,180,830 | 12/1979 | Roach | 369/58 |
| 4,183,060 | 1/1980 | Barnette | 369/43 |

Primary Examiner—Vincent P. Canney
Assistant Examiner—Alan Faber
Attorney, Agent, or Firm—E. M. Whitacre; J. S. Tripoli; E. P. Herrmann

[57] ABSTRACT

In an apparatus for detecting defects on capacitive video disc records, a pickup stylus spanning a plurality of information tracks is effectively swept over the recorded disc area by rotation of the disc. The stylus, upon encountering a convex surface defect, is lofted from the disc surface with a consequent reduction in stylus-disc capacitance. The change in capacitance is indicative of the stylus ejection distance and thereby releated to the size of the defect. Transducers monitor the radial position of the stylus and the angular position of the disc. Each time a disc defect generates a defect indicative capacitance change, the coordinates of the defect are recorded as well as the magnitude of the capacitance change.

10 Claims, 4 Drawing Figures

VIDEO DISC DEFECT DETECTOR

This invention relates to apparatus for detecting defects on the recorded surface of video disc records and in particular for detecting convex or outwardly directed microbumps on a capacitive type disc.

For quality control and defect analysis purposes, it is desirable to be able to rapidly detect and classify the defects on selected discs and to be able to rapidly locate those defects for inspection and analysis. A first method of detecting defects is simply to play the disc on a player apparatus and detect signal disturbances. The time to perform inspection by this technique is equal to the playtime of the record and is excessive for data gathering purposes. A second technique involves reflecting coherent light from the surface of the disc record under inspection and detecting anomalous reflection patterns indicative of surface defects. This optical method requires extremely sophisticated and expensive equipment to resolve typical defects found on a disc.

The present invention provides a relatively low cost, rapid means of scanning video discs for defects and provides information on the size of each particular defect along with its polar coordinates. The defect detector comprises a base for rotatably supporting the disc record to be inspected and a carriage mechanism for supporting and translating a scanning stylus radially across the rotating disc. The scanning stylus, hereinafter stylus, has a conductive electrode on a face normal to the disc, which face spans a number of record information tracks. A bottom edge of the electrode forms a capacitance with the disc. The average value of the capacitance is substantially constant for the stylus engaging the disc. The shoe or disc riding surface of the stylus is designed so that upon encountering a defect, the stylus will be bumped or lofted in a manner tending to disengage the stylus from the disc producing a dramatic decrease in the stylus electrode-disc capacitance, the amount of capacitance change being indicative of the height of the defect. A shaft encoder coupled with the rotating base provides information for ascertaining the angular position of the defect. A linear transducer coupled to the carriage provides information for ascertaining the radial position of the defect.

The invention will be more readily understood from the following detailed description and the accompanying drawings.

Figure 1:
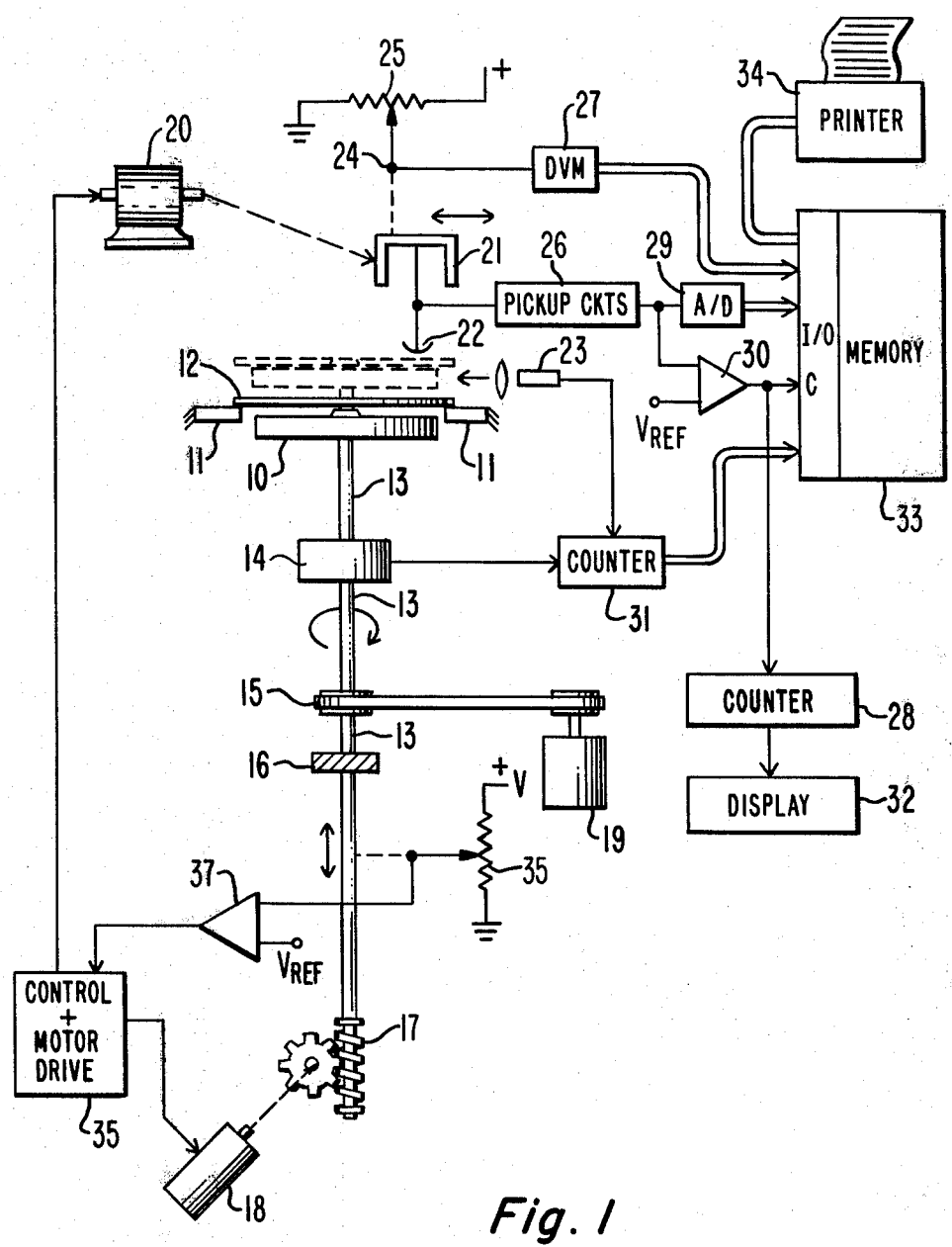
FIG. 1 is a partial schematic, partial block diagram of a defect detecting apparatus embodying the present invention.

Referring to FIG. 1, a defect detector is illustrated which scans a capacitive type video disc record for defects by rotating the recorded area of the disc past a stylus which is translated radially across the disc. The stylus engages the disc, forming a capacitance therewith, which capacitance is abruptly diminished by a defect bumping the stylus from the disc surface.

In the figure, a rotatable base or turntable 10 turns at a constant angular velocity driven by the motor 19 coupled to the turntable shaft 13 via the belt and pulley 15. The turntable is maintained spinning during the interchange of records to be inspected in order to minimize the detector disc loading period.

Loading a disc 12 on the turntable 10 is accomplished by placing the disc on a fixed support element 11 proximate the circumference of the turntable so that the record is supported a slight distance above the turntable. The spinning turntable 10 is raised, engaging the disc 12 and causing it to rotate (shown by the phantom lines). The shaft 13 and thereby the turntable 10 is raised and lowered by the linear actuator 17 (wormgear and cog, for example) driven by a stepper motor 18. The extent of vertical shaft travel is measured using a potentiometer mechanically coupled between the shaft and the defect detector support structure. A vertical displacement of the shaft 13 causes a corresponding change in the potential available at the potentiometer output terminal (or wiper), which potential is compared against a reference potential in the feedback amplifier 37. Amplifier 37 responsive to the potentiometer 35 output potential generates a control signal which when applied to the motor control circuitry 35 limits the vertical shaft excursions to predetermined positions. Note that the rotating turntable shaft 13 is coupled to the non-rotating shaft of the linear actuator 17 by a bearing structure 16.

A shaft encoder 14 (Litton Industries model 720-BZ-1800-312H-5 -1, for example) is directly coupled to the shaft 13. Encoder 14 provides a signal of N pulses per degree of rotation. The pulses are counted by the pulse counter circuit 31. Once per shaft or turntable revolution the counter is reset to zero at a predetermined angular reference, thus at any point in time, the angular position of the turntable and thereby the disc corresponds to the instantaneous number in the counter. For an encoder which provides 360 pulses per revolution, the number contained in the counter corresponds directly to the degrees of angular rotation relative to the reference point. In the drawing, a photocell 23 senses a mark on the turntable to generate the counter reset signal. Alternatively, the photocell may be arranged to sense a reference mark provided on the disc directly.

When the turntable 10 is raised, the disc record 12 engages a stylus 22 supported in a carriage mechanism 21. The carriage, driven by motor 20, draws the stylus radially across the disc at a rate to allow the disc riding shoe of the stylus to sweep over the entire recorded area of the disc.

The carriage motor 20 is energized by the control circuitry 35 in a programmed sequence such that defect scanning occurs automatically once the turntable achieves the proper raised position.

A potentiometer 25 is mechanically coupled to the carriage mechanism to provide an output potential proportional to the relative radial position of the stylus. The potentiometer output potential is applied to a digital volt meter 27 which displays a number corresponding to the current stylus position and also outputs a digital representation of the current position.

The stylus 22, forming a capacitance with the disc 12 is coupled to pickup circuits 26 to produce an electrical signal manifestation of the capacitance (see U.S. Pat. No. 3,842,194). The electrical manifestation of capacitance is applied to circuitry 29 where it is converted to digital form. In addition, it is compared against a reference potential in comparator 30 which generates a control pulse when the reference is exceeded, indicative of a defect induced stylus-disc capacitance change. The pulses are counted in circuitry 28 and displayed by the alphanumeric display device 32. The control pulses also strobe the current value contained in counter 31, the current digital output from digital volt meter 27 and the current digital representation of the electrical manifestation of stylus-disc capacitance into a memory device 33 for temporary storage of the information. Upon completion of a disc record scan, the information contained in memory device 33 is applied to the printer 34 which produces a permanent record of the information stored. Note that an alternative system may simply print out the defect coordinates and capacitance value as the disc is scanned, obviating the memory device.

Figure 2:
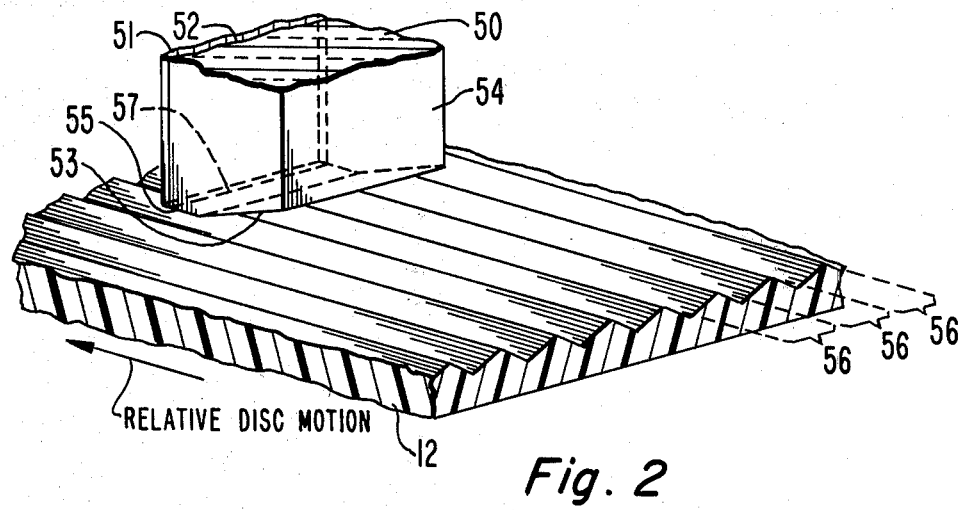
FIG. 2 is a schematic perspective representation of the stylus-disc interaction.

FIG. 2 shows a representative stylus for use in the defect detector. The stylus comprises a dielectric support structure 50 such as sapphire or diamond. One face 52 of the support structure supports a thin conductive electrode 51, the bottom edge of which forms a capacitance with the disc record. Ths stylus face 52 and therefore the bottom edge of the electrode 57 is normal to the direction colinear with the disc information tracks and spans a plurality of such tracks. The number of tracks spanned is determined by the spatial resolution desired in the system. Since the electrode spans a plurality of tracks, the effects of geometric variations defining signal elements within the particular tracks are generally averaged so that the stylus electrode-disc capacitance remains relatively constant as the record passes under the stylus.

Figure 3:
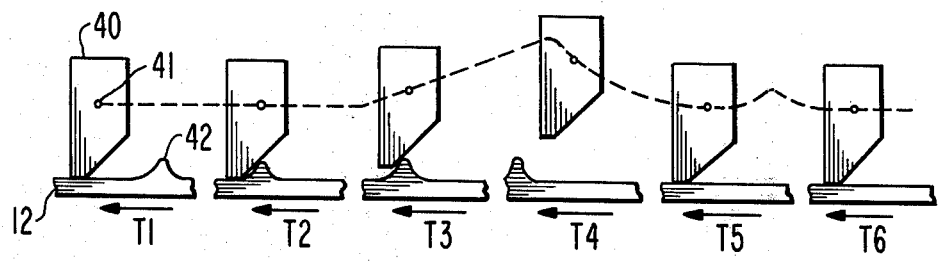
FIG. 3 is a diagrammatic representation showing the defect induced stylus-disc disengagement.

The shoe 55 of the stylus or at least a portion 53 thereof, is inclined toward the leading part 54 of the stylus structure. The inclination tends to permit the stylus to ride up defects which protrude above the disc surface without damaging the stylus nor shearing the defect. The stylus-defect interaction is pictured in the time sequence of FIG. 3. In the figure, the stylus 40 is fixed relative to the record 12 moving relative thereto in the direction indicated by the arrow. The broken line shows the vertical excursions of an arbitrary fixed point 41 on the stylus throughout the sequence T1–T6. Typically, as shown at interval T4, the stylus shoe does not simply follow the contour of a defect 42, but is lofted over and above the peak of the defect. The perturbation depicted in the broken line between periods T5 and T6 is included to indicate that the stylus bounces when it lands back on the disc.

Figure 4:
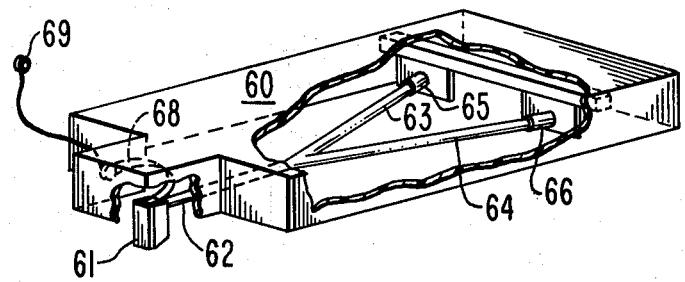
FIG. 4 is a schematic representation of the stylus support system.

The extent of stylus liftoff is dependent upon the vertical compliance of the stylus mounting arrangement with the carriage assembly and the mass of the stylus/stylus mounting structure. The greater the compliance to vertical motion, the greater the system sensitivity. FIG. 4 depicts a defect scanning stylus 61 mounted in a cartridge enclosure 60 for reception in the carriage (not shown). The stylus is mounted at a first end of a Y shaped stylus arm 62 comprised of hollow lightweight tubing. The arms 63 and 64 of the stylus arm are mounted to the cartridge by compliant couplings 65 and 66 respectively. Couplings 65 and 66 are formed from a highly compliant elastomer material such as buytl rubber, and permit the stylus arm to pivot freely in the vertical direction. The Y shape of the stylus arm with the two mounting points, however, inhibits lateral movement of the stylus so that its radial position is determined by the carriage position and is not susceptible of translation due to disc drag. Electrical connection is made between the stylus electrode and the cartridge body by a compliant conductive leaf spring 68 and connection is made between the cartridge and the pickup circuitry via terminal 69.

The capacitance change due to stylus lift-off is proportional to the size (height) of the defect encountered. The higher the stylus lift-off, the greater the stylus electrode-disc separation and the smaller the detected capacitance, i.e., the capacitance measured during lift-off is inversely proportional to the height of the defect. As a practical consideration, any protruding disc defect sufficient to disturb normal disc playback will cause relatively large change in the defect detector stylus capacitance so that convex defects may be easily detected. Depressions in the disc or changes in disc conductivity also result in capacitance reduction but these changes are typically small and therefore may be discriminated from the protruding or convex type of defects.

The height of a convex type defect may also be determined by counting the number of times the stylus bounces after being lofted. The higher the stylus is kicked away from the disc, the more times it will bounce on landing. The bouncing will occur within a limited time period, thus a counting window may be set to terminate the counting operation after a preset period in order to distinguish successive defects. Note that the system which measures the capacitance change to determine defect size must also "window" the measurement to preclude stylus bouncing from giving anomalous results.

What is claimed is:

1. A capacitive video disc defect test apparatus comprising:

a base for rotatably supporting a disc record;

a dielectric stylus having a face generally normal to the plane of the disc record and normal to information tracks on the surface of the disc record when in its operable position; said face having a thin electrically conductive electrode thereon, an edge of said electrode extending over a plurality of said information tracks, and the electrode and the disc forming a substantially constant capacitance therebetween substantially unaffected by record information;

a carriage for translating said stylus radially across the disc record in coordination with the disc rotation so that the entirety of the recorded disc area is swept by the stylus electrode;

means for compliantly mounting said stylus in the carriage so that the stylus engages the disc and is free to disengage the disc upon striking a convex disc defect;

means coupling with said electrode for measuring a decrease in the value of the electrode-disc capacitance indicative of the stylus electrode disengaging the disc record.

2. A capacitive video disc defect test apparatus comprising:

a base for rotatably supporting a disc record;

a dielectric stylus having a face generally normal to the plane of the disc record and normal to information tracks on the surface of the disc record when in its operable position; said face having a thin electrically conductive electrode thereon, an edge of said electrode extending over a plurality of said information tracks, and the electrode and the disc forming a substantially constant capacitance therebetween;

a carriage for translating said stylus radially across the disc record in coordination with the disc rotation so that the entirety of the record disc area is swept by the stylus electrode;

means for compliantly mounting said stylus in the carriage so that the stylus engages the disc and is free to disengage the disc upon striking a convex disc defect;

means coupling with said electrode for measuring a decrease in the value of the electrode-disc capacitance indicative of the stylus electrode disengaging the disc record; and means for determining the radial coordinates associated with a stylus-disc disengagement.

3. The disc defect test apparatus set forth in claim 2 wherein said means for determining said radial coordinate includes:

a potentiometer mechanically coupled between the stylus translating carriage and a fixed point of said apparatus, said potentiometer producing at an output terminal thereof, a potential proportional to the relative carriage position.

4. The disc defect test apparatus set forth in claim 3 further including means for scaling the potentiometer potential and converting said potential to a radial coordinate representative potential.

5. The disc defect test apparatus set forth in claim 2 further comprising means for determining the angular coordinate associated with a stylus-disc disengagement.

6. The disc defect test apparatus set forth in claim 5 wherein the means for determining said angular coordinates includes a shaft encoder coupled with the rotatable base, said encoder generating at an output terminal thereof an electrical manifestation of the angular displacement of said rotatable base.

7. The disc defect test apparatus set forth in claim 6 wherein said electrical manifestation is a uniform sequence of pulses, each pulse indicative of a successive angular unit of change, and said test apparatus further including counting means for counting the number of pulses occurring in said sequence, said counter being reset once per revolution of the rotatable base at a predetermined angular coordinate.

8. The disc defect test apparatus set forth in claim 2 further including means for selectively engaging and disengaging the rotatable base from the disc record without substantially affecting the angular velocity of the rotatable base; and feedback means mechanically coupled with said rotatable base for precluding the means for engaging and disengaging said rotatable base from said disc from overextending a predetermined position.

9. The disc defect test apparatus set forth in claim 2 wherein the shoe of the stylus engaging the disc record is inclined at an angle so that the leading edge of said stylus shoe is displaced from the surface of the disc, the inclined surface tending to loft the stylus from the disc in a controlled fashion on striking a defect.

10. The disc defect test apparatus set forth in claim 2 wherein the means for compliantly mounting the stylus comprises:

a stylus arm having the stylus secured to a first end thereof, the second end being secured to the carriage by an elastomer coupler; and means to preclude relative stylus arm-carriage displacement in a direction radially across the disc.

* * * * *